Aug. 1, 1950     J. W. ANDERSON, JR     2,516,939
REAR-VISION MIRROR
Filed Aug. 16, 1947

INVENTOR.
James W. Anderson, Jr.
BY
Elmer Jamison Gray
ATTORNEY.

Patented Aug. 1, 1950

2,516,939

UNITED STATES PATENT OFFICE 2,516,939

REAR-VISION MIRROR

James W. Anderson, Jr., Detroit, Mich., assignor to Accessory Research Corporation, Detroit, Mich., a corporation of Michigan Application August 16, 1947, Serial No. 768,999

2 Claims. (Cl. 248—203)

This invention relates to rear vision mirrors for vehicle bodies, such as automobile bodies, and in particular to a mirror assembly which may be readily mounted upon the outside of the front door of an automobile immediately beneath the window thereof.

In conventional automobiles the front door is usually provided with a main window opening adapted to be closed by means of a front pivoted wing-type glass panel and a vertically slidable glass panel immediately in rear thereof. The present mirror assembly is constructed for attachment to the outer metal door panel immediately beneath the pivoted wing with the mirror preferably positioned relatively close to the door so as to be as near as is practicable to the driver and to afford the maximum clear vision to the rear of the car.

An object of the invention is to provide an improved outside rear-view mirror assembly or unit which has a base adapted to extend longitudinally of the car body and attachable to the outside of the front door beneath the window thereof in such manner as to be theft-proof when the door is closed.

A further object of the invention is to provide an improved outside rear view mirror assembly including a mirror supporting bracket having an elongate base adapted to be mounted on the front door of an automobile body immediately beneath the pivoted wing thereof, the bracket also including an arm extending outwardly of the base and carrying a mirror at its outer end, and the mirror base being secured to the body at two longitudinally spaced points by fastening means concealed when the car door is closed.

Another object of the invention is to provide a mirror structure as above described in which the rear fastening means comprises an angularly extending pin on the base insertable obliquely through a hole in the door panel so as to be tightly wedged or held therein, the front fastening means comprising a screw extending through the door overlap flange from the inside thereof into the mirror base.

Other objects of this invention will appear in the following description and appended claims, reference being had to the accompanying drawings forming a part of this specification wherein like reference characters designate corresponding parts in the several views.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 2:
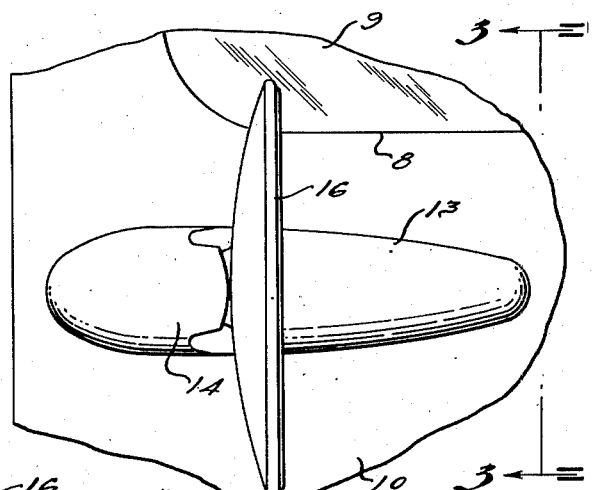
Fig. 2 is a front elevation of the device shown in Fig. 1.
Figure 3:
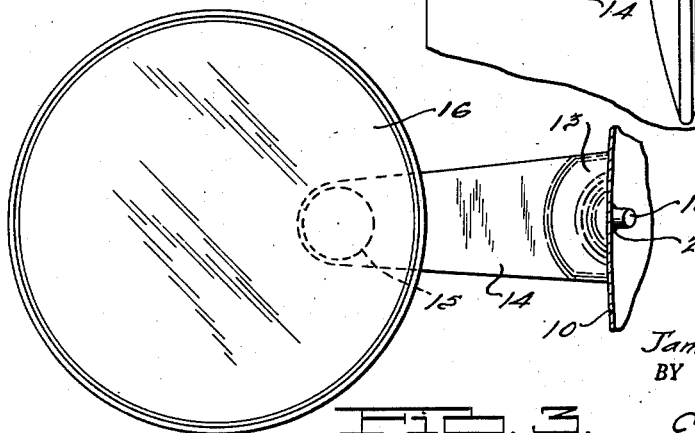
Fig. 3 is a side elevation, partly in section, taken from lines 3—3 of Fig. 2 looking in the direction of the arrows.

In the drawings there is illustrated, by way of example, one embodiment of an outside rear vision mirror assembly or unit for an automobile body or the like. The mirror assembly and fastening means therefor are constructed for installation upon the front door, such as the lefthand front door of the vehicle body. In accordance with conventional practice the front door comprises an outer metal door panel 10 and an inner metal door panel flanged or pressed to provide a front upright jamb edge 11 terminating at its outer edge in a forwardly extending flange 11a. The front edge of the outer metal door panel 10 is folded or crimped around the edge of the flange 11a to provide with the adjacent portion of the outer metal door panel the usual door overlap flange 12 which extends vertically substantially the full height of the door along the front edge thereof. The door is provided in the usual manner with a main window opening 8 (Fig. 2) adapted to be closed, for example, by means of a front pivoted wing-type glass panel 9 and a vertically sliding glass panel (not shown) positioned in the usual manner immediately to the rear of the wing-type panel. In accordance with the present invention the rear vision mirror assembly or unit is preferably attached to the outer metal door panel 10 and to the door overlap flange 12 immediately beneath the wing-type glass panel 9 so as not only to provide a mirror which will afford clear vision to the rear of the car but also will be theft-proof when the door is closed.

Figure 1:
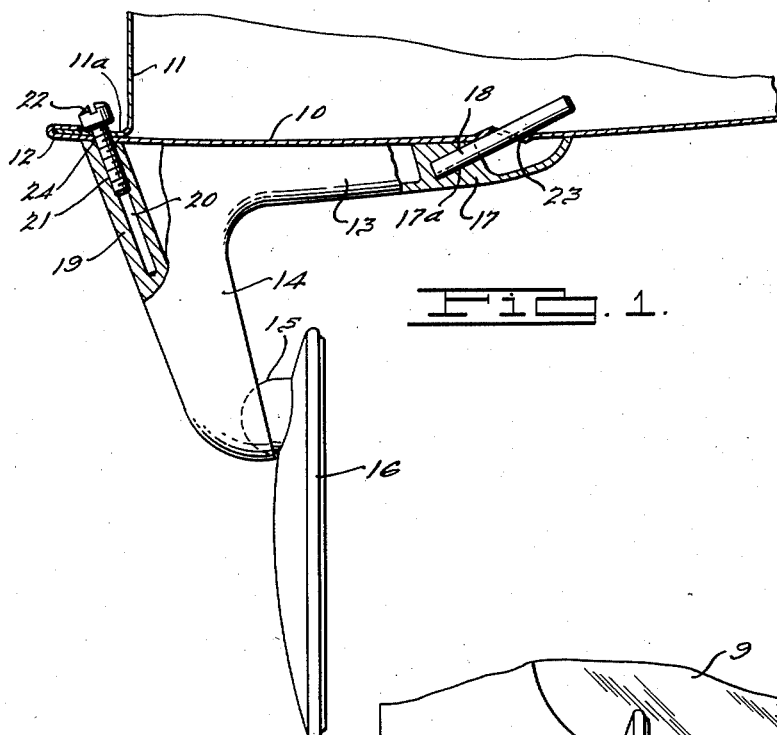
Fig. 1 is a top plan view, partly in section, illustrating an outside rear view mirror assembly or device installed upon a lefthand front door of an automobile body.

The present mirror assembly comprises an angularly formed mirror supporting bracket which is preferably in one piece and produced by a die casting operation. Referring to Fig. 1, it will be seen that the supporting bracket includes an elongate base 13 having a bottom surface shaped so as to fit smoothly against the outer metal door panel 10. The base, when mounted upon the door, extends longitudinally thereof and horizontally so as to lie substantially parallel to the lower edge of the main window opening of the door and somewhat therebelow. Extending outwardly from the forward end of the base 13 is an angularly extending arm 14 to the outer end of which is pivotally connected through the medium of a conventional ball and socket joint 15 a mirror 16. Thus, the mirror 16, which may be of any conventional type commonly used in connection with outside rear view mirrors, is adjustable upon the outer end of the arm 14 through the medium of the ball and socket joint 15, thereby enabling the mirror to be properly focused by the operator of the automobile while sitting in the driver's seat.

The base 13 of the mirror supporting bracket is cast to provide adjacent its rear end a rib or boss 17. This rib is drilled to provide a hole 17a extending obliquely with respect to the plane of the bottom surface of the base 13. A pin 18 of suitable length is rigidly secured within the hole 17a, as by means of a press fit, and this pin not only extends obliquely with respect to the base of the supporting bracket but also inwardly thereof and in a rearward direction.

The supporting bracket at its forward end is also provided with a reinforcing or stiffening rib 19 which extends from the bottom of the base outwardly through the arm 14. This rib is drilled through the inner end thereof to provide a hole 20 and a portion of this hole is tapped or threaded at 21 to receive the threaded shank of an attaching screw 22.

For the purpose of assembling the mirror unit upon the door, the panel 10 is pierced to provide a round hole 23 of a size to permit the pin 18 to be inserted therethrough in an angular direction. The door overlap flange 12 is also pierced to provide a hole 24 which extends through the flange 11a and also the adjacent portion of the outer door panel 10. To install the mirror supporting bracket upon the door the outer end of the pin 18 is first inserted in the hole 23 and thereupon the base 13 is moved rearwardly so as to drive the pin 18 obliquely through the hole 23. This operation may be accomplished by tapping the front end of the mirror bracket with a mallet, and as the pin 18 is forced angularly through the hole 23 it will distort or bend to a certain extent opposite edges of the hole 23, thus causing the pin to be very firmly gripped or anchored in the hole. The bracket is forced rearwardly with the pin 18 being forced through the hole 23 until the tapped hole 21 in the front end of the bracket registers with the hole 24 in the door overlap flange 12. Thereupon the threaded shank of the screw 22 is shifted through the hole 24 and threaded into the tapped hole 21 in the bracket until the head of the screw engages tightly the inner face of the door overlap flange.

It will thus be seen from the foregoing that the supporting bracket for the rear view mirror assembly may be attached to the door in convenient manner while at the same time rendering the device fully theft-proof when the door is closed. This will be evident from a consideration of Fig. 1 in which the attaching pin 18 is entirely concealed by the base 13 and the attaching screw 22 is entirely concealed by the door overlap flange 12 when the door is closed. In addition to the advantage of being fully theft-proof, it will be seen that the attaching means at opposite ends of the mirror base serve to clamp the base rigidly in position against any possibility of loosening during operation of the vehicle.

I claim:

1. An outside rear vision mirror assembly for an automobile body or the like having a front door provided with a window and an outer door panel, comprising a base adapted to be mounted on the door panel beneath said window, an arm extending outwardly and integrally from said base and adapted to carry a mirror at its outer end, a pin fixed to the base and extending obliquely and inwardly of the base and adapted to be forced obliquely through a hole in said door panel so as to have tight frictional engagement with the edges of said hole, and additional fastening means detachably securing the base to the door and accessible only from the inner side of the door.

2. An outside rear vision mirror unit for an automobile body or the like having a front door provided with a window and an outer door panel, comprising a base having an outwardly projecting mirror supporting arm, fastening means fixed to the base at the underside thereof for securing the latter to the door panel and being concealed when the base is mounted on the door, said fastening means comprising a pin fixed to the base and extending obliquely and inwardly of the base and adapted to be forced obliquely through a hole in said door panel so as to have tight frictional engagement with the edges of said hole.

JAMES W. ANDERSON, Jr.

REFERENCES CITED

The following references are of record in the file of this patent:

UNITED STATES PATENTS

| Number | Name | Date |
| --- | --- | --- |
| 1,335,881 | Dottl | Apr. 6, 1920 |
| 2,364,165 | Sarnes | Dec. 5, 1944 |
| 2,447,786 | Anderson | Aug. 24, 1948 |
| 2,456,425 | Nemec | Dec. 14, 1948 |